United States Patent [19]

Soga et al.

[11] Patent Number: 4,491,562

[45] Date of Patent: Jan. 1, 1985

[54] THERMAL FATIGUE RESISTANT LOW-MELTING POINT SOLDER ALLOYS

[75] Inventors: Tasao Soga, Hitachi; Takaya Suzuki, Katsuta; Masahiro Okamura; Masahiro Gooda, both of Hitachi; Fumiyuki Kobayashi, Sagamihara, all of Japan

[73] Assignee: Hitachi, Ltd., Tokyo, Japan

[21] Appl. No.: 501,995

[22] Filed: Jun. 7, 1983

[30] Foreign Application Priority Data

Jun. 11, 1982 [JP]  Japan ................. 57-101254

[51] Int. Cl.³ ................................. C22C 30/04
[52] U.S. Cl. ......................... 420/589; 219/85 H; 228/263.11; 420/580
[58] Field of Search ............... 420/570, 589, 580; 219/85 H, 146.1; 228/263.11; 148/442

[56] References Cited

FOREIGN PATENT DOCUMENTS 46-36446  10/1971  Japan ............................ 420/570

OTHER PUBLICATIONS

"Bismuth Solders," The Metal Industry Magazine, Mar. 5, 1943 issue, pp. 150-151.

Primary Examiner—L. Dewayne Rutledge
Assistant Examiner—Debbie Yee
Attorney, Agent, or Firm—Antonelli, Terry & Wands

[57] ABSTRACT

This invention provides a thermal fatigue resistant, low-melting point solder alloy consisting of 13 to 20% by weight Bi, 42 to 50% by weight, Pb, the balance being Sn. This solder alloy is suited for lap joints of electronic parts into or onto a printed substrate or a hybrid substrate.

2 Claims, 8 Drawing Figures

FIG. 1a
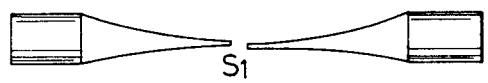
FIG. 1b
FIG. 1c
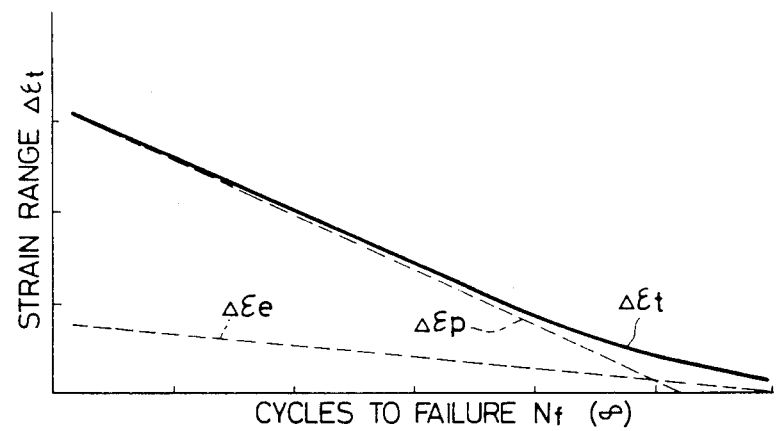

4,491,562

THERMAL FATIGUE RESISTANT LOW-MELTING POINT SOLDER ALLOYS

BACKGROUND OF THE INVENTION

This invention relates to an alloy having an excellent thermal fatigue resistance which is suitable for through-hole connections or flat mountings of electronic parts in or on printed substrates, hybrid substrates, etc., at temperatures below the melting point of Sn-40% by wt. Pb solder (solid phase, 183° C.; liquid phase, 190° C.).

The connection of elements or parts by passing lead wires through holes in a printed substrate and wave-soldering them with an Sn-40% by wt. Pb eutectic solder is a popular practice in the assembly of semiconductor parts and elements. However, in view of the recent trend toward high-density mounting and hybridization which requires the mounting of a large variety of multi-functional parts onto a printed board and, on the other hand, the necessity of removing and replacing parts in the event of a failure, it is fairly difficult to maintain the high reliability of the joints when using an Sn-40% by wt. Pb eutectic solder alone because of the necessity of re-melting joints (soldered zones) during the removal of demounting of parts. Accordingly, a new type of solder is required which can be used at a low melting point in combination with the conventional Sn-40% by wt. Pb solder, with a high reliability of the soldered joints, and also with special thermal fatigue resistance properties comparable with or even better than those of conventional solders.

Generally, soldering is performed at a temperature somewhat higher than the liquid-phase temperature of the solder to provide a good wettability with the soldered area. Any solder used in combination with conventional Sn-40% by wt. Pb solder must be treated at a working temperature which does not exceed the solid-phase temperature (183° C.) of the Sn-40% by wt. Pb solder.

An attempt to lower the melting point by adding a third metal (Bi) to a Sn-Pb solder is disclosed in Japanese Patent Publication No. 36446/71. The solder of Example 1 (60% by wt. Sn-5% by wt. Bi-35% by wt. Pb) of this patent has a liquid phase temperature of 175° C., and therefore it is impossible to use this solder to control the actual working temperature so that it does not exceed the solid phase temperature (183° C.) of Sn-40% by wt. Pb solder. The solder compositions of Examples 2 and 3 have liquid phase temperatures of 200° C. and 190° C., respectively, which are well above 183° C., so that their use in combination with the conventional Sn-40% by wt. Pb solder is also impossible.

SUMMARY OF THE INVENTION

An object of this invention is to provide a very reliable solder alloy which can be used at a lower melting point than that of Sn-40% by wt. Pb solder, and which is comparable with or better than Sn-40% by wt. Pb solder in the thermal fatigue resistance thereof at soldered joints.

Another object of this invention is to provide a solder alloy having a melting point of between 135° C. (solid phase) to 170° C. (liquid phase).

It is also an object of this invention to provide a solder alloy which can withstand about $10^3$ thermal cycles in an acceleration test with a −65° C. to 125° C. cooling-heating cycle.

The solder alloys according to this invention have compositions consisting of 13–20% by weight Bi, 42–50% by weight Pb, the balance being Sn. The best composition consists of approximately 18% by weight Bi, 45% by weight Pb, the balance being Sn.

BRIEF DESCRIPTION OF THE DRAWINGS

FIG. 1a is a front view of a test piece used in an initial tensile test.

FIG. 1b is a front view of the test piece after failure.

FIG. 1c is a diagram showing the relationship between the number of cycles until a test piece failed in initial tensile tests, and the strain deformation.

DESCRIPTION OF PREFERRED EMBODIMENTS OF THE INVENTION

Figure 2:
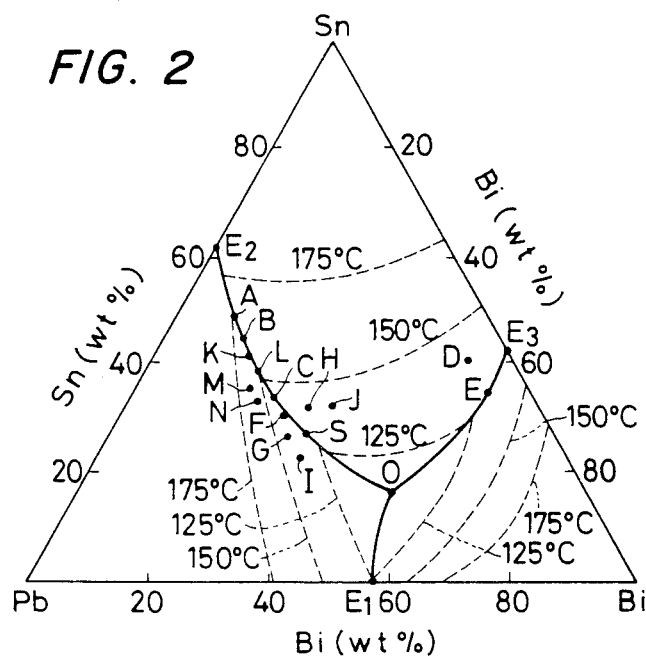
FIG. 2 is a phase diagram of Pb-Sn-Bi three-component alloys.

The temperature range in which solders melt was defined to be between 135° C. (solid phase) to 170° C. (liquid phase) because of the requirement that the soldered joints must be able to withstand −65° C. to 125° C. thermal cycles and also for reasons of soldering workability. A decrease in Bi and an increase in Pb cause a corresponding widening of the melting temperature range and a reduction of the wettability, resulting in a wider difference in melting temperature range between these types of solder and Sn-40% by wt. Pb eutectic solder, making it difficult to obtain a lap joint in which the treatment temperature is varied in steps, so that these types of solder were excluded from study even if they had good thermal fatigue resistances.

Solder is at a temperature higher than its own recrystallization temperature when at room temperature, so that under normal conditions it is in substantially the same state as an ordinary metal heated to a high temperature. As a result of comparative examinations of the life expectancy of solders determined from initial tensile test data (Young's modulus, tensile strength, reduction of area, etc.) at room temperature, and the thermal fatigue life determined from thermal cycle tests of specimens prepared by soldering materials having different thermal expansion coefficients, it was found that they have a close correlation. This means that thermal fatigue resistance can be evaluated from initial tensile test data of a solder.

A method of evaluating this thermal fatigue resistance qualitively is described below.

FIG. 1a shows a test piece (round bar) of 4 mm in diameter used in the initial tensile tests, and FIG. 1b shows a test piece after failure.

Formula (1) below defines the total strain in range $\Delta\epsilon_t$, and formula (2) defines the reduction of area $\phi$.

$$\Delta \epsilon_t = \Delta \epsilon_e + \Delta \epsilon_p = 3.5 \frac{\sigma_u}{E} N_f^{-0.12} + \left( \ln \frac{1}{1-\phi} \right)^{0.6} N_f^{-0.6} \quad (1)$$

$\Delta \epsilon_e$: elastic strain range
$\Delta \epsilon_p$: plastic strain range
E: Young's modulus
$\sigma_u$: tensile strength
$\phi$: reduction of area
$N_f$: number of cycles to failure $$\phi = 1 - \frac{S_1}{S_0} \quad (2)$$

$S_1$: cross-sectional area after failure
$S_0$: initial cross-sectional area

From formula (1), the number of cycles to failure $N_f$, that is, the thermal fatigue life, is determined by the total strain range $\Delta \epsilon_t$ which is the sum of the elastic strain range $\Delta \epsilon_e$ and the plastic strain range $\Delta \epsilon_p$. $\Delta \epsilon_e$ depends on the tensile strength and Young's modulus, while $\Delta \epsilon_p$ depends on the reduction of area. However, in low-cycle (approx. $10^3$ cycles) thermal fatigue due to large-amplitude strain range, $\Delta \epsilon_e$ may be ignored because the low-cycle thermal fatigue life is decided substantially by the value of $\Delta \epsilon_p$ as shown in FIG. 1c. (High-cycle thermal fatigue life, which rarely becomes a matter of serious concern except for specific cases, can not be determined from $\Delta \epsilon_p$ alone because of the strong influence of $\Delta \epsilon_e$.) Thus, the low-cycle thermal fatigue life $N_f$ may be considered as a function of the reduction of area $\phi$. This means that a solder which shows a high percentage of contraction (reduction of area) in a room temperature tensile test also has a long low-cycle thermal fatigue life.

Among the Pb-Sn-Bi three-component alloys represented by the phase diagram of FIG. 2, those compositions whose melting temperature is within the range of 135° to 170° C. were studied by the above thermal fatigue resistance evaluation method based on the reduction of area. However, compositions containing more than 60% by weight Bi were excluded from the discussion because too high a quantity of Bi makes an alloy too frail. Compositions with a small Sn content were also excluded from the study because they have extremely poor wettabilities with the Cu and Ni in the metallized layer of a printed substrate, etc. The eutectic point of three-component compositions (melting point: 99.5° C.) is indicated by 0, the eutectic point of Sn-Pb alloys (melting point: 183° C.) by $E_2$ and that of Pb-Bi alloys (melting point: 125° C.) by $E_1$, and the three compositions indicated by D, E and $E_3$ located along the $OE_3$ eutectic line in the phase diagram were studied. Other compositions lying along the $E_2O$ eutectic line were also examined. Table 1 shows the reduction of area and wettability with a copper substrate (used as a substrate for a metallized layer) at a working temperature of 170° C. observed for the various compositions studied (the greater the wetted area, the better the wettability). The tensile strength and elongation of each composition tested are also shown in Table 1. As a result, it was found that a solder which shows a favorable reduction of area also has a good wettability, which means that no specific consideration need be given to wettability in such solder compositions.

TABLE 1

| | Composition | Reduction of area (%) | Wettability (mm²) | Tensile strength (kg/mm²) | Elongation (%) |
|---|---|---|---|---|---|
| A | Sn—10Bi—41Pb | 13.6 | — | 5.6 | 10.4 |
| B | Sn—14Bi—43Pb | 65.5 | 40.7 | 5.0 | 57.3 |
| C | Sn—23Bi—32Pb | 30.5 | 27 | 5.5 | 18.4 |
| D | Sn—54Bi—6Pb | 10.4 | 15 | 6.3 | 5.3 |
| E | Sn—59Bi—6Pb | 11.6 | 14 | 6.2 | 7.4 |
| F | Sn—28Bi—42Pb | 5.4 | 24 | 5.5 | 3.0 |
| G | Sn—31Bi—43Pb | 39.6 | 23 | 4.6 | 11.8 |
| H | Sn—31Bi—38Pb | 11.6 | 23 | 5.6 | 4.4 |
| I | Sn—34Bi—44Pb | 30.1 | 22 | 3.3 | 12.9 |
| J | Sn—35Bi—32Pb | 13.9 | 20 | 4.8 | 6.0 |
| K | Sn—16Bi—43Pb | 59.6 | 42.9 | 5.0 | 37.3 |
| L | Sn—18Bi—43Pb | 57.9 | 33 | 5.0 | 38.3 |
| M | Sn—18Bi—45Pb | 91.1 | 43 | 4.8 | 96.3 |
| N | Sn—22Bi—45Pb | 49.8 | 29 | 4.8 | 35.1 |
| $E_3$ | Sn—58Bi | 25.2 | 32 | 9.0 | 16.0 |
| S | Sn—33Bi—41Pb | 16.7 | 21 | 4.8 | 5.7 |
| O | Sn—18Bi—47Pb | 75.0 | 37 | 4.9 | 40.1 |
| P | Sn—18Bi—50Pb | 65.1 | 35 | 4.9 | 37.0 |
| Q | Sn—16Bi—45Pb | 80.0 | 40 | 4.8 | 50.1 |
| R | Sn—16Bi—47Pb | 75.0 | 40 | 4.8 | 45.0 |

Figure 3:
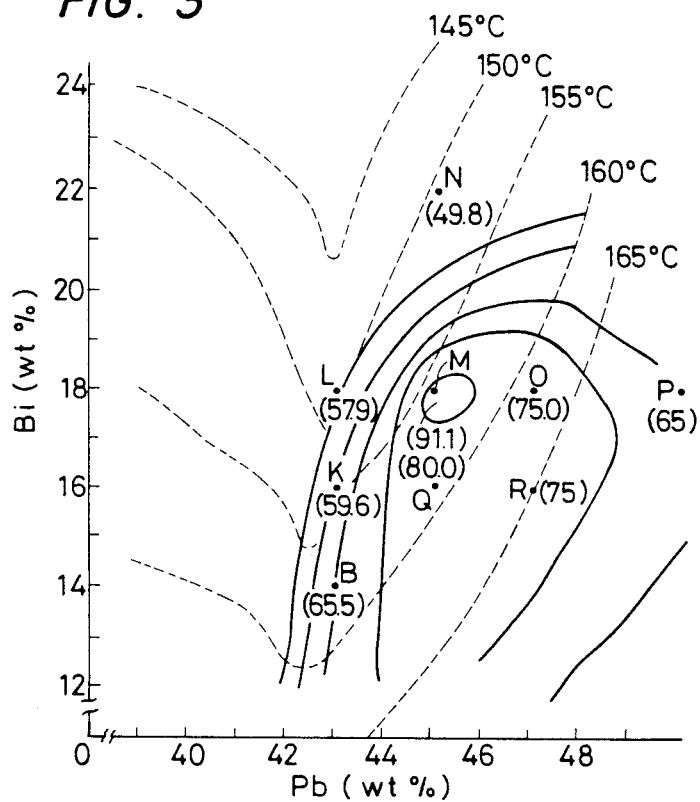
FIG. 3 is a graph showing the distribution of reductions of area in an optimum compositions of Pb-Sn-Bi three-component solder alloys.

FIG. 3 shows the distribution of the measured values of reduction of area (indicated by contour lines) of the compositions within the region of favorable reduction of area. In the graph, the percentage by weight of Pb is indicated along the abscissa and that of Bi along the ordinate, isothermal lines of melting temperature are indicated by broken lines. The dip in each isothermal line indicates the eutectic point. For example, if a percentage of reduction of area of approximately 60% or above (which corresponds to an element in practical use which can withstand $4 \times 10^3$ thermal cycles of an approximately 50° C. temperature difference in a low-cycle thermal fatigue life test) is given as a criterion, then those solder alloys of FIG. 3 which conform to such a standard those are having compositions consisting of 13–20% by weight Bi, 42–50% by weight Pb, the balance being Sn.

If the value of the standard reduction of area is set at 90% or above (corresponding to an actual element capable of withstanding $4 \times 10^3$ thermal cycles of an approximately 70° C. temperature difference), the solder alloys of FIG. 3 which conform to this standard are those with compositions consisting of approximately 18% by weight Bi, approximately 45% by weight Pb, the balance being Sn.

A reduction of area of about 60% is equivalent to a capacity to withstand $10^3$ thermal cycles in an acceleration test.

The standard for such a reduction of area differs according to the purpose of the solder alloy.

Figure 4:
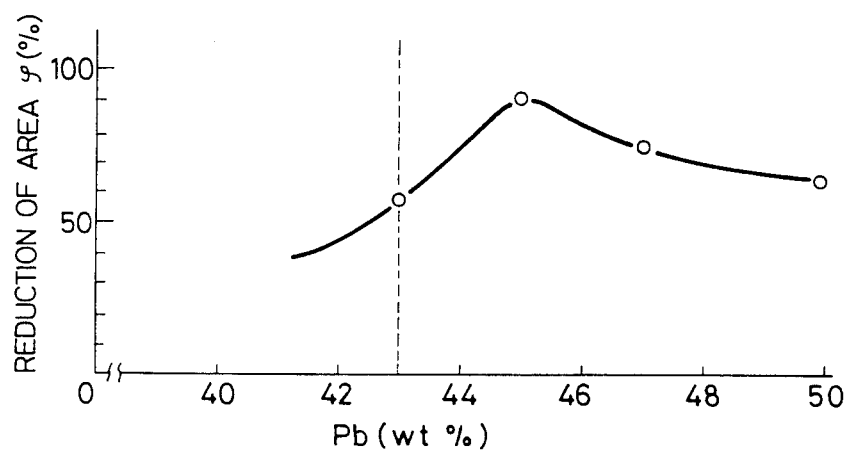
FIG. 4 is a graph showing the relationship between Pb content and reduction of area in optimum compositions of Pb-Sn-Bi three-component solder alloys.

It can be seen that the region of good reduction of area falls within the zone of compositions whose Pb content is higher than the eutectic compositions. For instance, for the compositions H and G of FIG. 2, H has an appreciably lower reduction of area because this composition is in the region of high Sn content (low Pb content) while G has a relatively good reduction of area as this composition is in the region of high Pb content. FIG. 4 shows the relationship of the reduction of area to Pb content when the Bi content is kept constant (18% by weight). It can be seen that, in this case, a peak occurs on the higher Pb content side of the eutectic line shown by the broken lines. A similar tendency is seen with Pb-Sn two-component compositions also, in which case the region of good reduction of area also lies toward the side where the quantity of Pb is higher than the eutectic compositions.

Figure 5:
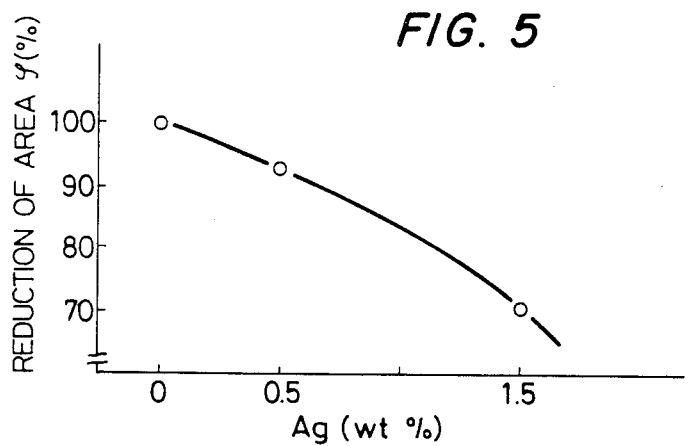
FIG. 5 is a graph showing the relationship between Ag content and reduction of area in a solder alloy made by adding Ag to an Sn-18% by wt. Bi-45% by wt. Pb three-component alloy.

FIG. 5 illustrates the effect on the reduction of area when another element (Ag in this case) was added to an Sn-18% by wt. Bi-45% by wt. Pb three-component alloy. Generally speaking, when another element is added to make a solid solution, the solder becomes harder and stronger but reduction of area and elongation are reduced, resulting in a shortened life during which it thermal fatigue resistance is maintained.

The addition of Ag gives rise to the problem of electro-migration. Also, multiple-component systems involve difficulties in the management of compositions used for wave soldering.

Table 2 gives a comparison of the properties of a conventional Sn-40% by wt. Pb solder and a low-melting point solder of this invention (Sn-18% by wt. Bi-45% by wt. Pb) which is optimal for lap joints.

TABLE 2

| Composition | Melting temperature range (°C.) | Tensile strength (kg/mm$^2$) | Elongation (%) | Reduction of area (%) | Wettability (mm$^2$) |
|---|---|---|---|---|---|
| Conventional solder Sn-40% by wt. Pb | 183–190 | 4.0 | 81.3 | 90 | 50 |
| Solder of this invention Sn-18% by wt. Bi-45% by wt. Pb | 150–157 | 4.8 | 96.3 | 91.0 | 43 |

According to Table 2, the solder of this invention and the conventional one have a sizable difference in melting temperature but are close in tensile strength, elongation, reduction of area and wettability, which indicates the suitability of the solder of this invention when applied to lap joints on the same printed substrate.

Figure 6:
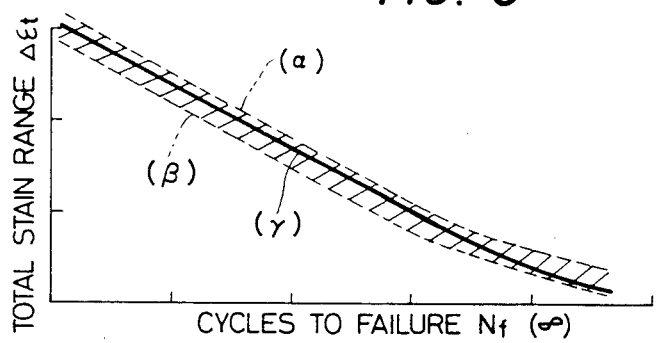
FIG. 6 is a graph showing the thermal fatigue life expectancies of Sn-18% by wt. Bi-45% by wt. Pb, Sn-16% by wt. Bi-43% by wt. Pb and Sn-40% by wt. Pb solder alloys.

FIG. 6 is a graph plotting the thermal fatitue life expectancies determined by substituting the property values of Table 2 to obtain values of $\Delta\epsilon_t$ from formula (1) above.

In FIG. 6, the broken line ($\alpha$) indicates the life expectancy of the Sn-18% by wt. Bi-45% by wt. Pb solder, the broken line ($\beta$) the life expectancy of the Sn-16% by wt. Bi-43% by wt. Pb, and the hatched area between the two broken lines ($\alpha$) and ($\beta$) is the region in which the reduction of area is greater than 60%. The solid line ($\gamma$) represents the Sn-40% by wt. Pb solder.

The results of measurements of the thermal fatigue life expectancies show that the three-component solder alloys compare well with the Sn-40% by wt. Pb solder in life expectancy. The three-component solders are inferior to Sn-40% by wt. Pb solder in wettability with copper, but this difference can be remedied by using a somewhat strong flux. When the burn-out rates of the two solders, Sn-18% by wt. Bi-45% by wt. Pb and Sn-40% by wt. Pb, were compared from the results of thermal cycle tests (−65° C. to 125° C.) on soldered joints of through-holes in a printed circuit board, it was found that Sn-18% by wt. Bi-45% by wt. Pb is equal to or better than Sn-40% by wt. Pb in burn-out rate.

The low-melting point solder alloys of this invention with a high thermal fatigue resistance and good wettability are capable of forming very reliable lap joints with conventional Sn-40% by wt. Pb solder for steric wiring and flat mountings on and in high-density printed boards, hybrid substrates, etc.

The low-melting point solders of this invention also have excellent corrosion resistance and a safety equal to that of Pb-Sn solders.

What is claimed is:

1. A thermal fatigue resistant, low-melting point solder alloy consisting of approximately 18% by weight Bi, approximately 45% by weight Pb, and the remainder being Sn.

2. A thermal fatigue resistant, low-melting point solder alloy haing a melting point of 150°–157° C., which consists of 18% by weight of Bi, 45% by weight of Pb and 37% by weight of Sn.

* * * * *